(12) United States Patent
Vercellino et al.

(10) Patent No.: US 10,729,056 B2
(45) Date of Patent: Aug. 4, 2020

(54) VEHICLE WITH TRAILER, OPERATIVELY CONNECTED THERETO THROUGH A CARDAN

(71) Applicants: Pierangelo Vercellino, Alice Bel Colle (IT); Valerio Raganelli, Prasco (IT)

(72) Inventors: Pierangelo Vercellino, Alice Bel Colle (IT); Valerio Raganelli, Prasco (IT)

(*) Notice: Subject to any disclaimer, the term of this patent is extended or adjusted under 35 U.S.C. 154(b) by 0 days.

(21) Appl. No.: 16/065,226

(22) PCT Filed: Dec. 22, 2016

(86) PCT No.: PCT/IB2016/057932
§ 371 (c)(1),
(2) Date: Jun. 22, 2018

(87) PCT Pub. No.: WO2017/109746
PCT Pub. Date: Jun. 29, 2017

(65) Prior Publication Data
US 2019/0307054 A1    Oct. 10, 2019

(30) Foreign Application Priority Data
Dec. 22, 2015 (IT) .................. 102015000086307

(51) Int. Cl.
*A01B 71/02* (2006.01)
*A01B 59/04* (2006.01)
(Continued)

(52) U.S. Cl.
CPC .............. *A01B 71/02* (2013.01); *A01B 59/04* (2013.01); *A01B 59/042* (2013.01); *A01B 76/00* (2013.01);
(Continued)

(58) Field of Classification Search
CPC ........ B60K 17/28; B60K 25/06; A01B 61/00; A01B 61/02; A01B 61/025; A01B 71/02; A01B 71/06; A01B 71/063; A01B 71/066; A01B 76/00; A01B 63/111; A01B 63/1117; A01D 75/182; A01D 2075/203
See application file for complete search history.

(56) References Cited

U.S. PATENT DOCUMENTS 3,908,398 A * 9/1975 Braunberger ........ A01B 71/066
                                                     180/14.1
4,024,804 A * 5/1977 Hanson ................. A01F 15/141
                                                     100/5
(Continued)

FOREIGN PATENT DOCUMENTS

DE   10 2005 026017 A1   12/2006
GB        2 389 087 A    12/2003

*Primary Examiner* — Barry Gooden, Jr.
(74) *Attorney, Agent, or Firm* — Bay State IP, LLC

(57) ABSTRACT

Disclosed herein is a vehicle (1) with trailer (2), operatively connected thereto through a cardan (3), comprising sensing means (4) of the angle ($\alpha$, $\beta$) between the vehicle (1) and the cardan (3), between the trailer (2) and the cardan (3) or between the vehicle (1) and the trailer (2), comparison means of the angle with a threshold angle and means (7) which disengage the power take-off upon exceeding in one direction the threshold angle and which engage It when the angle exceeds again the threshold angle in the opposite direction. The vehicle according to the present invention is a towed load.

7 Claims, 9 Drawing Sheets

(51) Int. Cl.
  *B60K 17/28* (2006.01)
  *B60K 25/06* (2006.01)
  *A01B 76/00* (2006.01)
  *A01B 59/042* (2006.01)
  *A01C 23/04* (2006.01)
  *A01D 34/416* (2006.01)
  *A01D 34/64* (2006.01)
  *A01D 101/00* (2006.01)

(52) U.S. Cl.
  CPC ............ *B60K 25/06* (2013.01); *A01C 23/047* (2013.01); *A01D 34/416* (2013.01); *A01D 34/64* (2013.01); *A01D 2101/00* (2013.01); *B60Y 2200/221* (2013.01)

(56) References Cited

U.S. PATENT DOCUMENTS

| | | | | |
|---|---|---|---|---|
| 5,355,971 | A * | 10/1994 | Austin | A01B 71/066 180/53.1 |
| 5,558,163 | A * | 9/1996 | Hollstein | A01B 67/00 172/2 |
| 6,099,191 | A * | 8/2000 | Werner | A01B 71/08 403/24 |
| 6,123,155 | A * | 9/2000 | Hollstein | A01B 63/10 172/2 |
| 6,418,646 | B1 * | 7/2002 | Bykov | E02F 5/08 37/190 |
| 2002/0069629 | A1 * | 6/2002 | McLeod | A01B 59/042 56/11.9 |
| 2003/0024782 | A1 * | 2/2003 | Hrazdera | B60K 25/06 192/3.63 |
| 2003/0188909 | A1 * | 10/2003 | Ohashi | A01D 34/6806 180/300 |
| 2005/0108999 | A1 * | 5/2005 | Bucher | A01D 75/28 56/10.2 R |
| 2008/0194383 | A1 * | 8/2008 | Berglund | B60K 25/06 477/97 |
| 2009/0198425 | A1 * | 8/2009 | Englert | B60D 1/30 701/70 |
| 2009/0258717 | A1 * | 10/2009 | Higgins | A01B 71/06 464/182 |
| 2010/0242637 | A1 * | 9/2010 | Inamori | B60K 25/00 74/15.86 |
| 2010/0242638 | A1 * | 9/2010 | Steffens | B60K 17/28 74/15.86 |
| 2013/0118141 | A1 * | 5/2013 | Arnold | A01B 78/1007 56/367 |
| 2013/0213157 | A1 * | 8/2013 | Martin | B60K 17/28 74/15.82 |
| 2015/0260516 | A1 * | 9/2015 | Davey | G01C 9/02 701/36 |
| 2016/0167719 | A1 * | 6/2016 | Higashiguchi | A01B 63/10 180/336 |
| 2017/0188505 | A1 * | 7/2017 | Potier | A01B 69/003 |
| 2017/0354091 | A1 * | 12/2017 | Van Mill | B60P 1/40 |
| 2018/0095175 | A1 * | 4/2018 | O'Keeffe | G01S 17/66 |

\* cited by examiner

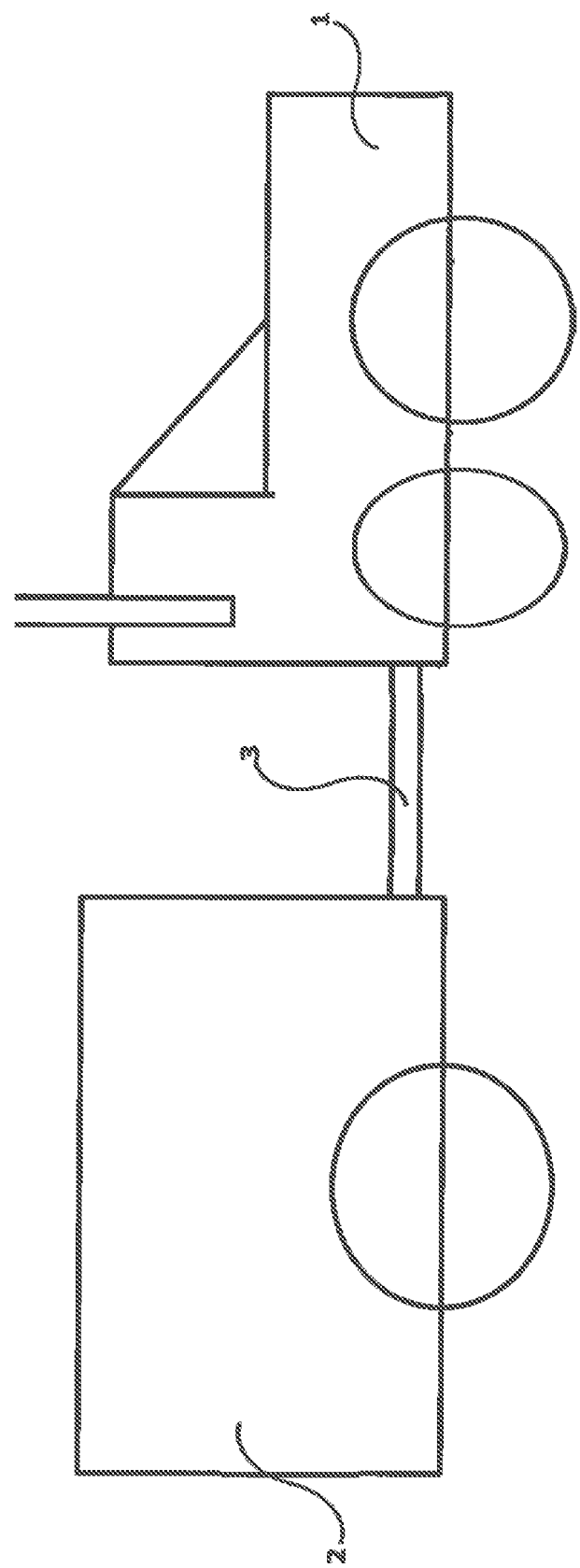

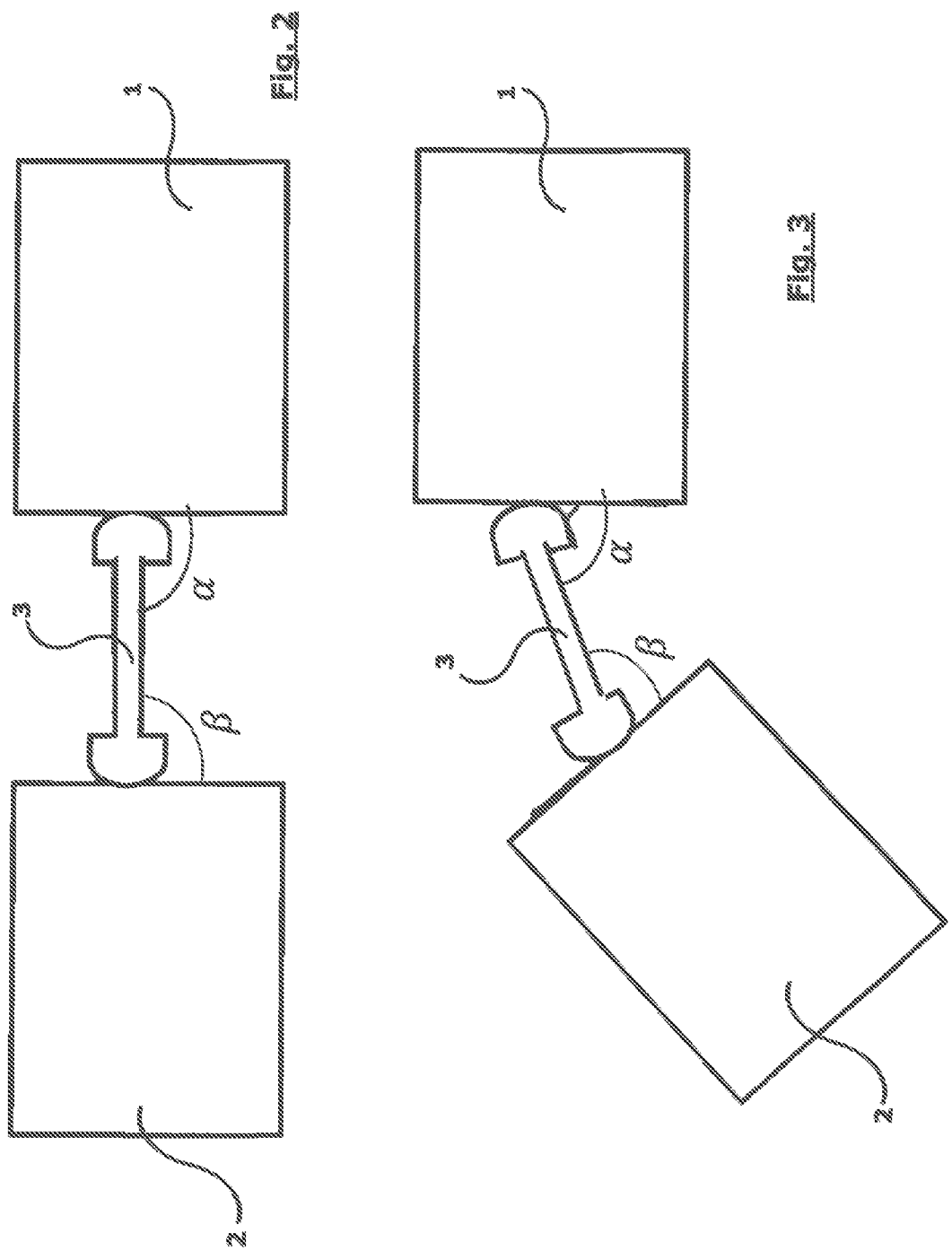

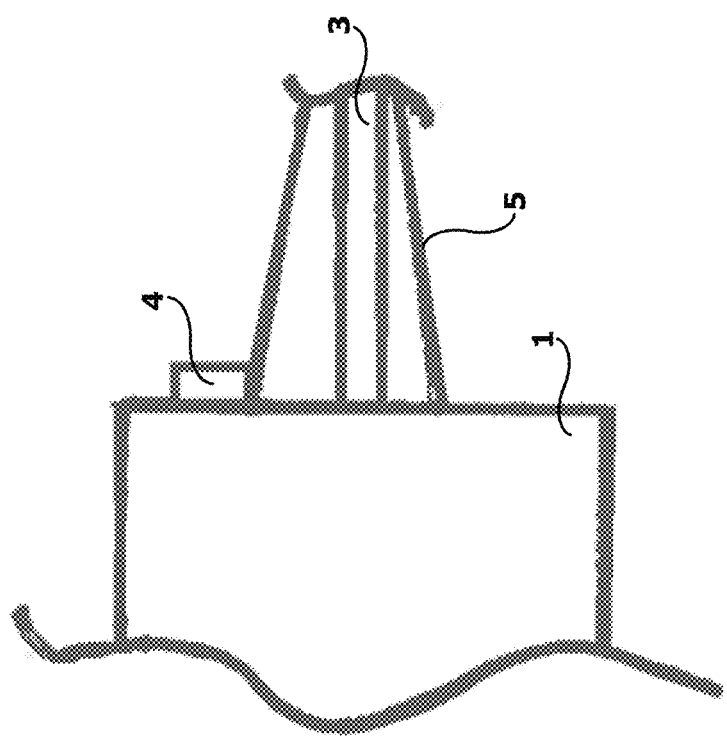

VEHICLE WITH TRAILER, OPERATIVELY CONNECTED THERETO THROUGH A CARDAN

CROSS REFERENCE TO RELATED APPLICATION

This application is for entry into the U.S. National Phase under § 371 International Application No. PCT/IB2016/057932 having an international filing date of Dec. 22, 2016, and from which priority is claimed under all applicable sections of Title 35 of the United States Code including, but not limited to, Sections 120, 363,and 365 (c) and which in turn claims priority under 35 USC 119 to Italian Patent Application No. 102015000086307 filed on Dec. 22, 2015.

The present invention relates to a vehicle with a trailer, operatively connected thereto by means of a cardan. In particular, although not exclusively, the present invention relates to a vehicle for agricultural use.

In prehistoric times, men began to feed themselves from what nature spontaneously offered them. Thus, it was possible for them to eat fruits and mushrooms or roots. An activity that was mostly practiced was, then, the hunting of animals that were deemed suitable. This way of eating meant that man had to move frequently in search of new animals and new fruits, when he finished those naturally present in an area.

As time passed, men realised that the accidental fall of seeds from a fruit led to the growth of a plant with the same fruits, so they began to cultivate the soil systematically and ceased to live as nomads, becoming mostly sedentary. Since then, agriculture has been the main activity with which man obtains food.

In order to achieve significant results, agriculture requires many operations, besides sowing and harvesting. In fact, it is necessary to prepare the soil for planting by ploughing it and turning it over, remove weeds that could choke crop plants, prune multiannual plants in periods when there are no leaves, fertilise the soil, spray the leaves and fruits with substances against parasites and other operations. At first, all these operations were carried out by hand (as still happens in some poor Countries), with rudimentary tools, like hand ploughs, hoes and the like. Later on, animals were used for these operations. For example, until about a century ago, ploughs were mostly transported by oxen. With the advent of the internal combustion engine, oxen were almost completely replaced by tractors that could move, due to very large wheels or tracks, even on rough terrain, often carrying heavy loads. These loads are normally transported in two ways: by carrying them or towing them. The problems that the agricultural equipment designer must face are different in the two cases. This description shall relate only to the case of tractors with towed load.

The tractor is very often used to tow trailers for the most diverse uses. In particular, tractors are often used to tow other agricultural machines, for example to fertilise the soil, to spray leaves or to cut excessively long branches or grass. In turn, tractor-towed machines normally require energy in order to operate. To avoid installing independent engines on these machines, for example other combustion engines or electric motors, which would require independent power supply and which would imply, because of yields obviously below 100% for each of them, a high energy waste, the so-called power take-off was designed. The power take-off consists of a mechanical connection between tractor and trailer, which allows, by turning under the action of the engine of the tractor, to apply to towed machines the mechanical energy developed by the engine of the tractor, so as to exploit more fully the energy which moves the tractor.

Commonly, the power take-off is constituted by a rod, set in rotation by the engine of the tractor, consisting in a substantial protrusion of the transmission shaft of the tractor and which carries the same rotation to a motor shaft of the towed machine. Said projection is a slotted male element, designed to fit into the slotted female element of a cardan. For example, in this way, it is possible to operate a pump for spraying liquids or to fertilise.

Normally, the rod of the power take-off is realised with a cardan that allows the transmission of the tractor curve to the trailer, allowing under certain circumstances to maintain rod rotation and power transmission. The most common power take-offs allow even high rotation speeds, for example between 500 and 1000 revolutions per minute. Most power take-offs rotate at 540 rpm or 1,000 rpm or offer the possibility to select one of these two speeds. Some more advanced models provide for the proportionality of the rotation of the cardan to the speed of the tractor engine.

In the agricultural practice, it is common to use such machines in row-arranged fields. For example, to spray verdigris on vines, it is necessary to go along rows with a tractor, with the same tractor towing a trailer with a verdigris tank, a pump which draws from the tank and nozzles for spraying, fed by the pump. The pump is kept in operation by the power take-off of the tractor. At the bottom of the row, it is necessary to turn the tractor and trailer by 180° to turn around the head of the row and start spraying the next row. This operation, despite being conceptually very simple, has, in addition to the normal difficulties created by agricultural soil, which is usually quite rough, a problem concerning power take-off. Indeed, for its very nature, the cardan can work correctly at angles formed between the rear of the tractor and/or between the front of the trailer (perpendicular to the axles of the tractor and the trailer) and said cardan up to about 35°; a curve that results in the creation of smaller (or greater than 145°) angles between the vehicle and the cardan causes breakage of the cardan, with the stop of the operation in progress and a long and costly replacement. For this reason, those driving the tractor, arrived at the end of the row, must manually disengage the power take-off, thus suspending the rotation of the cardan, perform the conversion and, when the curve is over and the angle returns toward 90°, engage again the power take-off, thereby restoring the rotation of the cardan.

Driving a tractor is a rather complicated task and requires special attention to the terrain, rugged and sometimes dangerous, attention to the speed to be adapted to the terrain and the task at hand, care to avoid excessive slopes. The addition of the engagement and disengagement operations of the power take-off thus adds to a number of others that require considerable attention by the driver and can thus be forgotten. Forgetting to disengage the power take-off leads, as previously said, to breakage of the cardan, while forgetting to re-engage it causes the tractor to continue to travel, consuming time and fuel, without continuing its work, so that it is done badly or must be repeated. Moreover, attention to engagement and disengagement of the power take-off may distract the driver from other aspects he should pay attention to and could ultimately be dangerous even for him.

US 2003/0 024 782 discloses a tool-bearing tractor which presents a hydraulic engagement and which protects the cardan from breakage due to excessively narrow angles in the lifting-lowering of the loading platform. The expression "tool-bearing" means that the hydraulic lifting device of the tractor bears a tool. This is achieved by using a solenoid valve which, at the exceeding of a threshold value, disengages the hydraulic engagement. However, this document does not refer to a towed load and an accidentally exceeded threshold angle that the cardan forms on a vertical plane (the only angle that the cardan may form in a tool-bearing vehicle is that linked to raising and lowering of the hydraulic lifting device) is, however, a rare occurrence, usually linked to poor driving of the vehicle. The two types of vehicle with a towed or borne trailer are clearly distinct, so that a transposition of any technical arrangement from a load bearing vehicle to a load-towing vehicle is not feasible, precisely because they are completely different in their own nature and conception.

The problem underlying the invention is to propose a vehicle structure with towed trailer which avoids breakage of the cardan due to creation of excessively narrow angles on the horizontal plane and which allows a continuous driving by the operator, thus obtaining the engagement and disengagement of a power take-off, without any intervention by the operator. This object is achieved through a vehicle with trailer, operatively connected thereto through a cardan, comprising sensing means of the angle between the vehicle and the cardan, between the trailer and the cardan or between the vehicle and the trailer, comparison means of the angle with a threshold angle and means which disengage the power take-off upon exceeding in one direction the threshold angle and which engage it when the angle exceeds again the threshold angle in the opposite direction, characterised in that said trailer is a towed load and in that sensing means of the angle are arranged around the cardan. The dependent claims describe preferred features of the invention.

Further features and advantages of the invention will anyhow be more evident from the following detailed description of a preferred embodiment, given by mere way of non-limiting example and illustrated in the accompanying drawings, wherein:

FIG. 1 is a side view of a generic tractor with towed trailer, joined by means of a cardan;

FIG. 2 is a schematic top view of a tractor joined to a trailer by a cardan, in rectilinear movement;

FIG. 3 is a view similar to FIG. 2, but in the course of a curve;

FIG. 6 is a side view, partially in section, of a detail of a further embodiment of the present invention;

Figure 5:
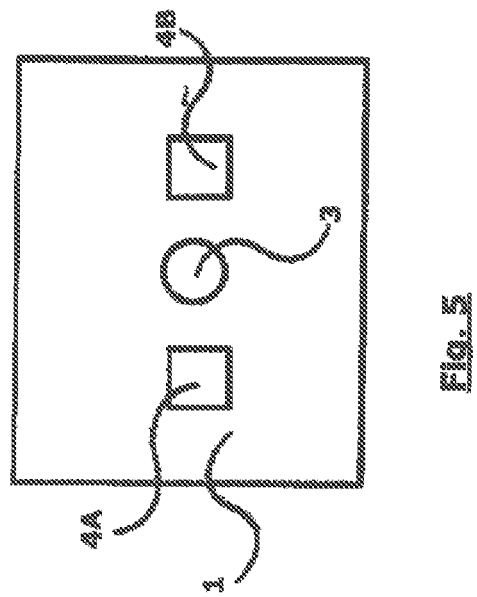
FIG. 5 is a schematic view of a detail according to an embodiment of the invention.
Figure 4:
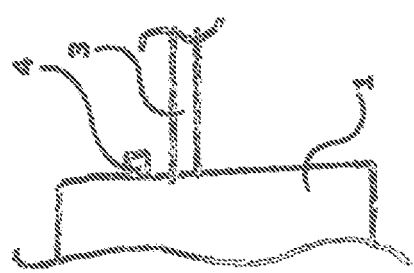
FIG. 4 is a schematic view of a detail of a vehicle according to the present invention.

The following description will be carried out illustrating the special case of a tractor 1, operatively connected by a cardan 3 to a towed trailer 2; however, the present invention is not limited to the only case of the tractor, but extends, in principle, to any vehicle with towed trailer, which bears a power take-off. It should be understood that the towing action of the trailer 2 does not take place through the cardan 3, but hooking a towing eye of the trailer 2 at a pin of the tractor 1.

The tractor 1 is a normal agricultural tractor, of the type that is commonly found on the market, except for what will be described below. Similarly, the trailer 2 is a normal towed trailer for agricultural machines; it can carry a sprayer, a string trimmer, a lawn-mower, a collecting machine or other. The cardan 3 is, in itself, an ordinary cardan, to be used for power take-off.

According to the present invention, sensing means 4 of the angle α which the cardan 3 forms with the tractor 1 and the angle β that the same cardan 3 forms with the trailer 2, are arranged between the tractor 1 and the cardan 3 and between the trailer 2 and the cardan 3, in contact with the same cardan 3, so that these angles are known in any moment of vehicle travel.

The means 4 may be any means adapted for sensing an angle. They may be electrovalves, pneumatic valves, infrared sensors, optic fibre sensors or photocells. Such devices are mostly simple, whilst giving sufficiently accurate results.

Said means 4 are arranged on the tractor 1 and trailer 2, for simplicity of construction. It is also possible to have the means 4 on the ends of the cardan 3, facing respectively towards the tractor 1 and trailer 2. Since, however, for safety reasons, the cardan 3 is generally covered by a casing (not shown in the drawings), the means 4 in this case must necessarily exit the casing itself. The means 4 for sensing angles α; β are arranged around the cardan (3), so that they can easily and immediately sense any angular movement.

FIG. 5 shows an embodiment of the present invention, in which said sensing means, 4A and 4B, are provided in two specimens, arranged preferably at 180° with respect to each other, so as to detect the right-left angular movements with a very simplified construction.

An alternative embodiment of the invention is represented in FIG. 6. In it, a single sensing means 4 an electrovalve, so that the movement automatically entails the sensing of the angle is positioned on the tractor 1 and/or on the trailer 2, contacting a sleeve 5 that is made to fit on the cardan 3 or, rather, on the casing normally present on the cardan 3, to be able to detect any movement in any direction.

Figure 7:
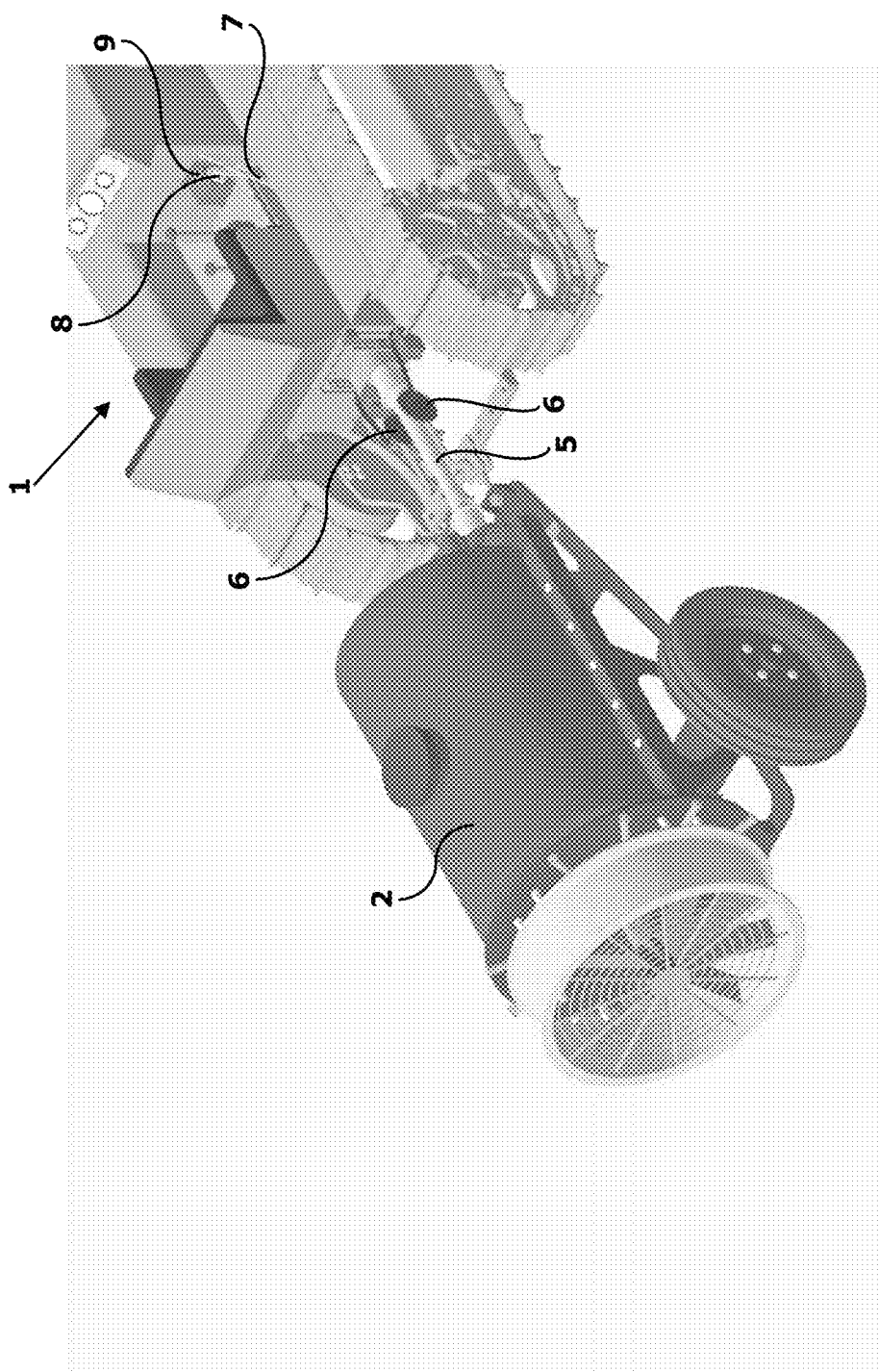
FIG. 7 is a perspective view of an alternative embodiment of the present invention, in an operating position.
Figure 8:
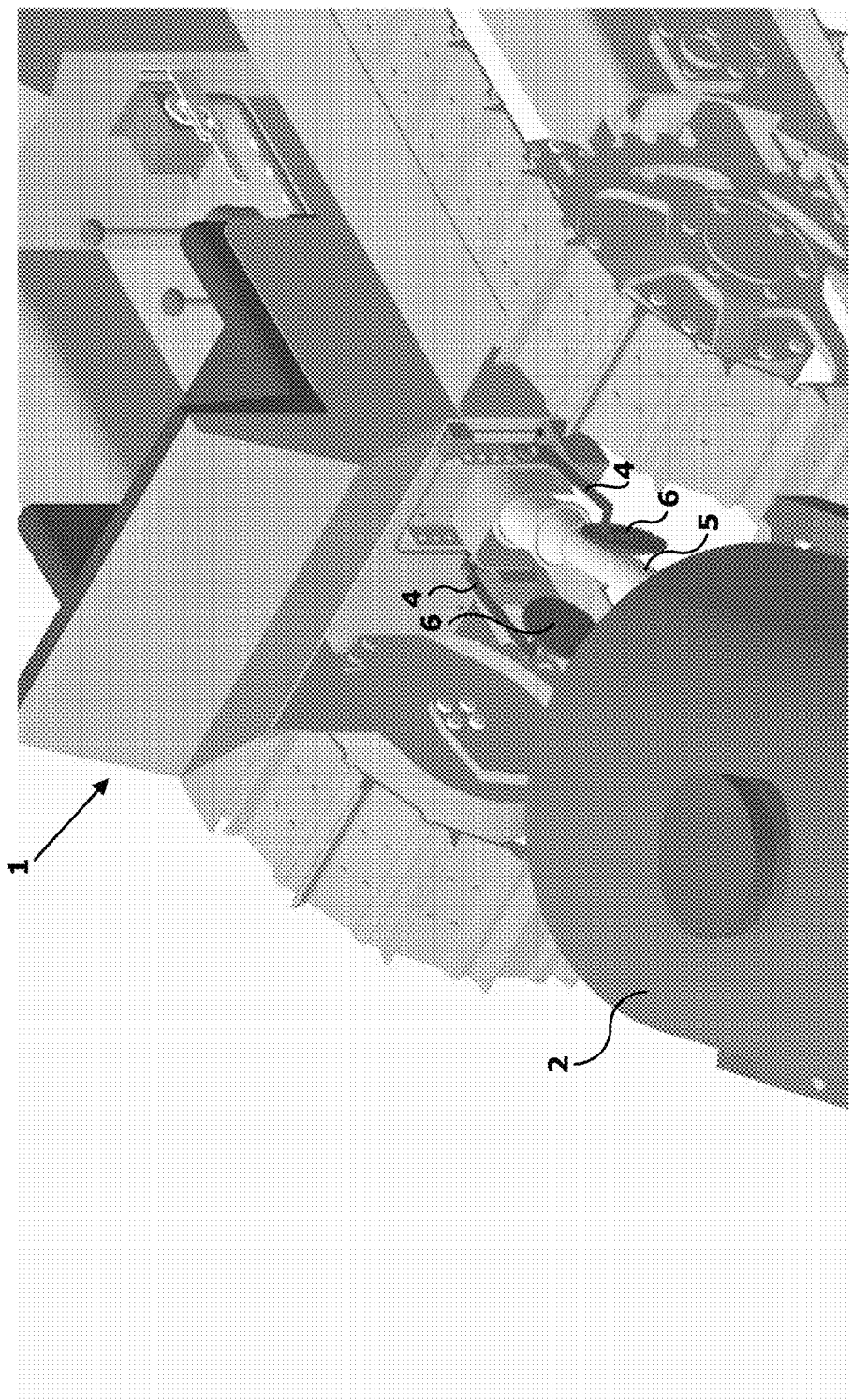
FIG. 8 is a detailed view of the embodiment of FIG. 7, in another operating position.
Figure 9:
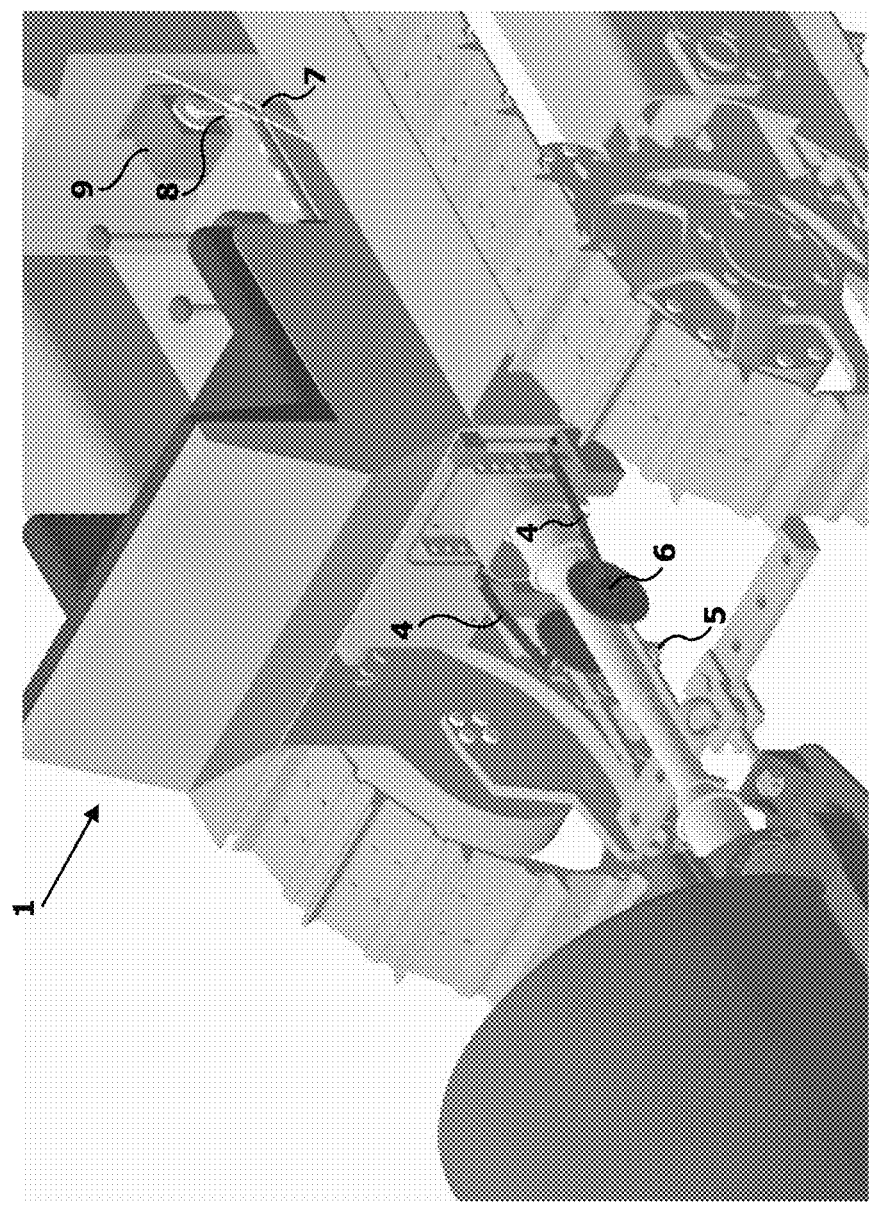
FIG. 9 is a detailed view as FIG. 8, but in the operating position of FIG. 7.

Another alternative embodiment is illustrated in FIGS. 7 to 9. As it can be seen in the above figures, the sensors 4, for example considering of constituted by an electrovalve, carry contact plates 6, to be placed on the cardan 3. FIGS. 7 to 10 also show a lever 7 to engage and disengage the power take-off, connected via an arm 8 to a motor 9. Said motor 9 is an electric motor, but any other type of motor can be used, without thereby affecting the operation of the present embodiment.

When the tractor 1 is used to tow the trailer 2, it starts from a situation such as that illustrated in FIG. 2. In this situation, the angle α and the angle β are both equal to 90°. In this situation, it is possible to insert the power take-off and the cardan 3 starts to rotate at the desired speed. In this way, the rotation of the engine of the tractor 1 transmits energy to the cardan 3 that rotates and, in turn, brings the motor, which drives the equipment contained inside the trailer 2 in rotation. For example, if verdigris is sprayed on the vines, this movement goes along each row and the movement of cardan 3 puts in rotation the motor of a pump contained in the trailer 2, which draws the verdigris solution from a dedicated tank and sprays it on vine leaves.

Still considering, purely by way of example and absolutely not of limitation, the case of verdigris sprayed on the vines, consider the moment when the tractor 1 reaches the end of the row. The driver will have to rotate the tractor 1 and trailer 2 around the head of the row, to perform a U-turn. Thus, a condition such as that illustrated in FIG. 3 is obtained. At a certain point, the angle α, the angle β or both will reach a value of 35° or less, or 145° or more. Thus, the angles α and β exceed downwards the 35° threshold angle and exceed upwards the 145° threshold angle (the two definitions are, of course, completely equivalent). If the cardan 3 continues to rotate at the desired speed, it would eventually break. So far, at the beginning of the U-turn, the driver of the tractor had to remember to switch off the power take-off, which led to the stop of rotation of the cardan 3 and the subsequent suspension of spraying. According to the present invention, instead, the sensors 4 continuously sense the angles α and β, sending their value to an appropriate data processing unit, not illustrated in the drawings.

An arrangement as that of FIG. 5 is used to sense the angles α and β in the right and left directions with respect to the travel direction of the vehicle, the only critical directions, as the trailer hitch, with its rigidity, makes the formation of dangerous vertical angles almost impossible. The embodiment illustrated in FIG. 6 allows to use only one sensor that checks and detects all the movements of the sleeve 5 with a single sensor 4.

The processing unit receives the signals from the sensors 4 and compares them with a threshold value, for example, but not limited to it, 35° and/or 145°. This value may also be higher, in order to increase the degree of safety, or lower, if the cardan is resistant even when working with angles of more than 35°. When the value of α, β of or both reaches the threshold value, the processing unit sends a signal to the power take-off, which determines its disengagement by known means. In this way, the cardan 3 stops rotating and the current operation—for example spraying with verdigris—is arrested.

Once the U-turn is completed, there is a passage from the situation illustrated in FIG. 3 to that illustrated in FIG. 2 and angles α and β return gradually to the value of 90°. According to the prior art, the driver must now re-insert the power take-off to restart spraying. If the driver forgets to do it as soon as possible, spraying could start too late (taking into account also the inertia time for the pump) and a good part of the new row (if not all) would be deprived of verdigris, which could result in damage to the fruits.

According to the present invention, the sensors 4 continue to sense the angles α and β and, as soon as the processing unit verifies that they are both above the threshold value—as mentioned, for example, greater than 35° or lower than 145°—send a signal to the power take-off that determines its immediate re-engagement. Possibility of an unplanned swing, that brings one of the angles below the threshold, involves in any case the disengagement of the power take-off and the rescue of the cardan 3. Presently, this particular case almost inevitably leads to breakage of the cardan 3, as an unexpected movement hardly allows the driver—already busy maintaining the balance of the vehicle 1 as stable as possible—to also think about the disengagement of power take-off.

Alternatively to what was previously seen, if the sensors 4 are photoelectric cells, they may be provided on the vehicle 1 and the trailer 2 (always in the vicinity of the cardan) and the measured angle is the angle between the vehicle 1 and the trailer 2, obtained by evaluating the mutual misalignment of photocells on the vehicle 1 and trailer 2. This system is particularly simple and cost-effective.

In the case represented in FIG. 6, the electrovalve 4 enables the disconnection of the power take-off also in the case in which, when vehicles are not running, an operator inadvertently touches the sleeve 5.

The present invention allows, therefore, to obtain the disengagement and engagement of the power take-off in a vehicle with the trailer connected by a cardan when the angle between the vehicle and the trailer causes a threshold value to be exceeded, in one direction or the other, without requiring the intervention of the operator driving the vehicle. In addition, the driver does not have to worry about the power take-off and the angle between the vehicle and trailer, which allows him to focus more on other operations he is performing. This cannot, of course, take place if the trailer 2 is a borne load, for the intrinsic features of this system that force lifting the load from the ground at each curve. In this way, breakage of the cardan 3 due to distraction or the excessively prolonged suspension of the operation being performed is avoided. In addition, there is a net increase of safety in the running of the vehicle, since the level of attention to driving by the driver increases considerably, while maintaining or even increasing the quality of the operation being performed. Furthermore, the time during which the power take-off is not engaged are reduced to the minimum exactly indispensable to avoid breakage.

In the vehicle according to the prior art, exceeding the threshold angles for short times does not normally cause the breakage of the cardan. However, stress that is still exerted on its casing entail its release and, sometimes, its breakage. This no longer occurs with the vehicle according to the present invention. In particular, the casing no longer rotates with the cardan 3, which guarantees a higher safety level.

With regards to the embodiment of FIGS. 7 to 11, in the normal straight travel condition, the sensors 4 bring the contact plates 6 in leaning on one side of the cardan 3. Under this operating condition, the power takeoff is engaged and, with the cardan 3, feeds energy to the towed trailer 2. The engagement and disengagement lever 7 is in the natural position, towards the lower part of the towing vehicle, as illustrated in FIGS. 7, 9 and 10B.

When α or β exceed the threshold value, for example 35° or 145°, the contact plate 6 external to the outer curve loses contact against the cardan 3, while the other is compressed, moving the sensor arm 4, for example an electrovalve. As soon as the threshold value is exceeded, the movement of the arm 4 of the electrovalve exceeds the point of action and gives an electrical signal, which is transmitted via the cables 10 or 10B to the cable 11 and from here to the motor 9, which shall enter into function, dragging the arm 8 towards it, which raises the power take-off engagement and disengagement lever 7, until it is in the position shown in FIGS. 8 and 10A. In this way, the power take-off is disengaged, ceasing to provide power to the trailer and placing the cardan into safe conditions, as seen so far in the present invention.

Figure 10B:
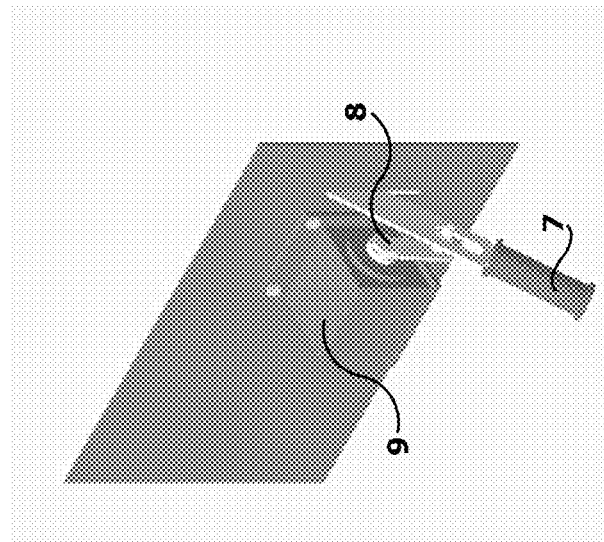
FIGS. 10A and 10B show a detail of the views according to FIGS. 7 to 9.
Figure 10A:
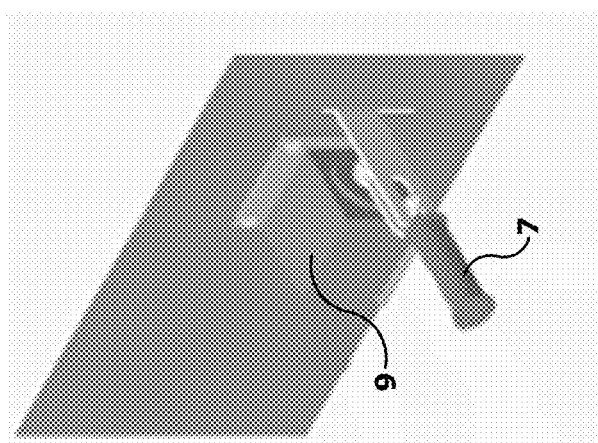
Figure 11:
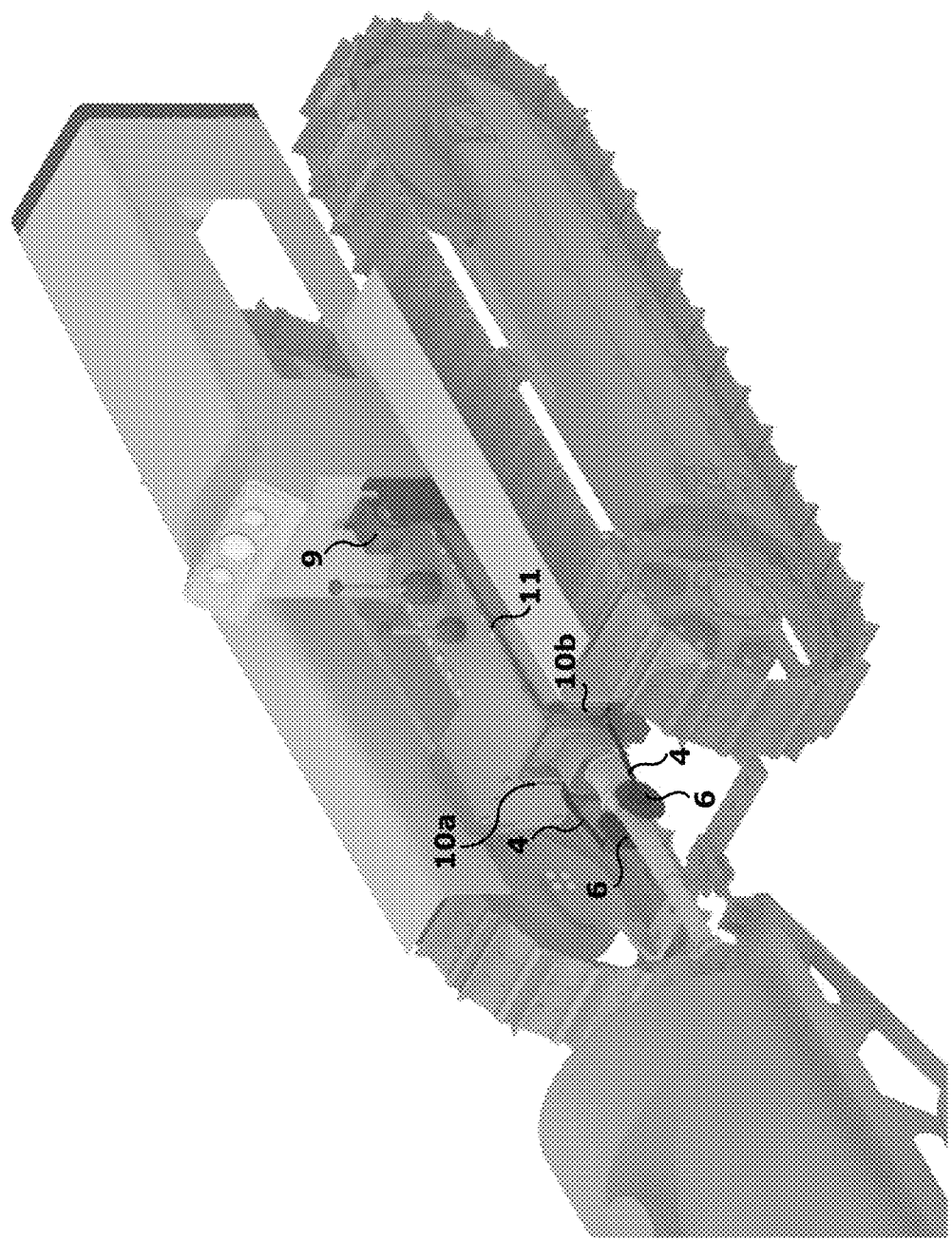
FIG. 11 shows a diagram of operation of the embodiment shown in FIGS. 7 to 10.

Once the curve is finished, the angle α or β exceeds the threshold value in the opposite direction and the electrovalve arm that had been moved exceeds again, this time in the reverse direction, the point of action and gives, through cable 10A or 10B, the cable 11 for signal which in turn transmits it to the motor 9, that pulls in the opposite direction the lever 7, which returns in the position of FIGS. 7, 9 and 10B, reinserting the power take-off and restarting the cardan 3.

The lever 7 can also, of course, be operated manually in case of need.

What has been seen above, it can also take place with a motor 9 which moves in one direction, in the presence of return springs that bring the lever 7 into the rest position, once the signal coming from the electrovalve 4 stops the motor, leaving the arm 8 and the lever 7 idle.

Therefore, the embodiment shown in FIGS. 7 to 11 consists in a vehicle as in any one of the preceding claims, characterised in that in said means 7 that disengage the power take-off at the overrun of the threshold angle in a direction and engage it when the angle exceeds again the threshold angle in the opposite direction are connected to an actuating motor 9 which is adapted to move said means upon reception of signals from the sensors 4 and which indicate the overcoming of said threshold angle, in a direction or another.

It is understood, however, that the invention is not to be considered as limited by the particular arrangement illustrated above, which represents only an exemplary embodiment of the same, but different variants are possible, all within the reach of a person skilled in the art, without departing from the scope of the invention itself, as defined by the following claims. In particular, the sensors could be of different type, or the vehicle may be different from a tractor or the threshold angles may be or become different.

LIST OF REFERENCE NUMERALS

1 Tractor
2 Trailer (of 1)
3 Cardan
4 Sensor
4A, 4B, 4C, 4D Sensors
5 Sleeve
6 Contact plates (of 4)
7 Power take-off engagement and disengagement lever
8 Arm (of 9)
9 Motor
10A Electric cable
10B Electric cable
11 Electric cable
α Angle between 1 and 3
β Angle between 2 and 3

The invention claimed is:

1. Vehicle (1) with trailer (2), operatively connected thereto through a cardan (3), characterised in that the vehicle with the trailer includes sensing means (4) of an angle (α; β) between the vehicle (1) and the cardan (3) or between the trailer (2) and the cardan (3), comparison means of the angle with a threshold angle and means (7) which disengage a power take-off upon exceeding in one direction the threshold angle and which engage the power take-off when the angle no longer exceeds the threshold angle in the one direction, characterised in that said trailer (2) is a towed load and in that the sensing means (4) of the angle (α; β) are arranged around the cardan (3); and characterised in that a single sensing means (4) is provided on the vehicle (1) and/or on the trailer (2), in contact with a sleeve (5) which is made to fit on the cardan (3) or on a casing found on the cardan (3).

2. Vehicle (1) as in claim 1, characterised in that the vehicle is a tractor.

3. Vehicle (1) as in claim 1, characterised in that the trailer (2) is an agricultural machine trailer, chosen in the group consisting of a sprayer, a string trimmer, a lawn-mower, and a harvesting machine.

4. Vehicle (1) as in claim 1, characterised in that said single sensing means of the angle (α; β) is chosen from the group consisting of electrovalves, pneumatic valves, infrared sensors, optic fibre sensors or photocells.

5. Vehicle as in claim 1, characterised in that in said means (7) which disengage the power take-off upon exceeding in the one direction the threshold angle and which engage it when the angle no longer exceeds the threshold angle in the one direction comprises an actuating motor (9) which is adapted to move said means upon reception of signals from the sensing means (4) and which indicate the exceeding of said threshold angle, in the one direction or another.

6. Vehicle as in claim 5, characterised in that said sensing means (4) are electrovalves, each carrying a contact plate (6), resting on a cardan wall during straight traveling.

7. Vehicle as in claim 5, characterised in that said means (7) which engage and disengage the power take-off comprises a lever, which can be manually actuated in case of necessity.

* * * * *